(12) United States Patent
Yang

(10) Patent No.: US 10,718,908 B2
(45) Date of Patent: Jul. 21, 2020

(54) OPTICAL FIBER ARRAY WITH HIGH RELIABILITY

(71) Applicant: SENKO ADVANCED COMPONENTS, INC., Marlborough, MA (US)

(72) Inventor: Kaifa Yang, Shanghai (CN)

(73) Assignee: Senko Advanced Components, Inc, Marlborough, MA (US)

(*) Notice: Subject to any disclaimer, the term of this patent is extended or adjusted under 35 U.S.C. 154(b) by 0 days.

(21) Appl. No.: 16/310,823

(22) PCT Filed: Oct. 26, 2017

(86) PCT No.: PCT/CN2017/107799
§ 371 (c)(1),
(2) Date: Dec. 18, 2018

(87) PCT Pub. No.: WO2018/077211
PCT Pub. Date: May 3, 2018

(65) Prior Publication Data
US 2019/0243071 A1 Aug. 8, 2019

(30) Foreign Application Priority Data
Oct. 27, 2016 (CN) .................... 2016 2 1180658 U

(51) Int. Cl.
*G02B 6/36* (2006.01)
*G02B 6/44* (2006.01)
(52) U.S. Cl.
CPC ............ *G02B 6/3644* (2013.01); *G02B 6/36* (2013.01); *G02B 6/3616* (2013.01); *G02B 6/4403* (2013.01); *G02B 6/448* (2013.01)
(58) Field of Classification Search
CPC ... G02B 6/3644; G02B 6/3614; G02B 6/4403
See application file for complete search history.

(56) References Cited

U.S. PATENT DOCUMENTS

| 4,225,213 A | 9/1980 | McBride, Jr. et al. |
| 4,778,242 A * | 10/1988 | Ota .................. G02B 6/2558 385/141 |

(Continued)

FOREIGN PATENT DOCUMENTS

| CN | 101587205 A | 11/2009 |
| CN | 103383482 A | 11/2013 |

(Continued)

OTHER PUBLICATIONS

International Preliminary Report on Patentability for PCT/CN2017/089551, dated Jan. 3, 2019, 13 Pages.

(Continued)

*Primary Examiner* — Sung H Pak
*Assistant Examiner* — Hoang Q Tran
(74) *Attorney, Agent, or Firm* — Edward S. Jarmolowicz, Esq.

(57) ABSTRACT

An optical fiber array with high reliability, which relates to the technical field of optical fibers is disclosed. The optical fiber array is composed of three parts, namely, optical fiber positioning substrate (1), cover plate (2) and optical fiber ribbon (3). One end of the optical fiber ribbon is striped to be a naked fiber (4). The naked fiber (4) is pressed into the micro-groove array of the optical fiber positioning substrate (1) by the cover plate (2) and glued and fixed with a glue layer (5), and a transitional region between the stripped part and the unstripped part of the optical fiber ribbon (3) is glued and fixed onto a rear half of the optical fiber positioning substrate (1) with the glue layer (5). It has a reasonable and novel structural design. Through frosting of the surfaces of the positioning substrate (1) and the cover plate (2) to be bonded with glue, gluing area between the glue layer and the optical fiber positioning substrate, the cover plate and the optical fiber ribbon can be increase and bonding strength of (Continued)

the glue layer can be enhanced so that it can work in harsh environment of high temperature and humidity without de-bonding to ensure positioning accuracy of optical fibers.

6 Claims, 1 Drawing Sheet

(56) References Cited

U.S. PATENT DOCUMENTS

| | | | |
|---|---|---|---|
| 5,901,262 | A | 5/1999 | Kobayashi et al. |
| 7,587,108 | B2 * | 9/2009 | Carpenter ............... G02B 6/30 385/137 |
| 2002/0081078 | A1 | 6/2002 | Melchior et al. |
| 2005/0141823 | A1 | 6/2005 | Han et al. |
| 2011/0064358 | A1 | 3/2011 | Nishimura |

FOREIGN PATENT DOCUMENTS

| | | |
|---|---|---|
| CN | 103809250 A | 5/2014 |
| CN | 105372770 A | 3/2016 |
| CN | 205404901 U | 7/2016 |

OTHER PUBLICATIONS

International Preliminary Report on Patentability for PCT/CN2017/089552, dated Jan. 3, 2019, 17 Pages.
Extended European Search Report; Application No. 17814739.3, dated Dec. 17, 2019, pp. 44.

* cited by examiner

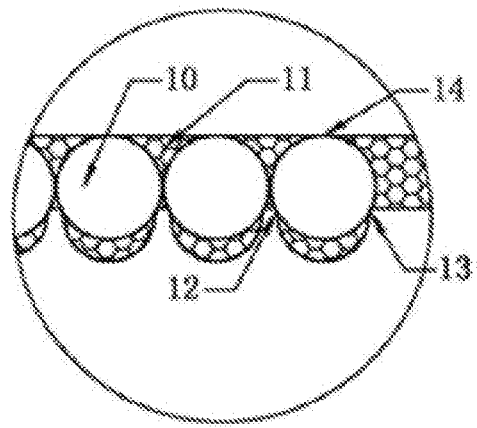
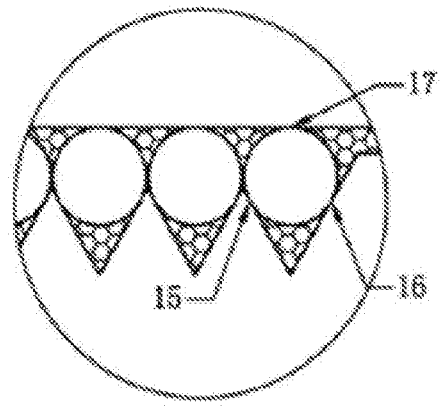
FIG. 1          FIG. 2
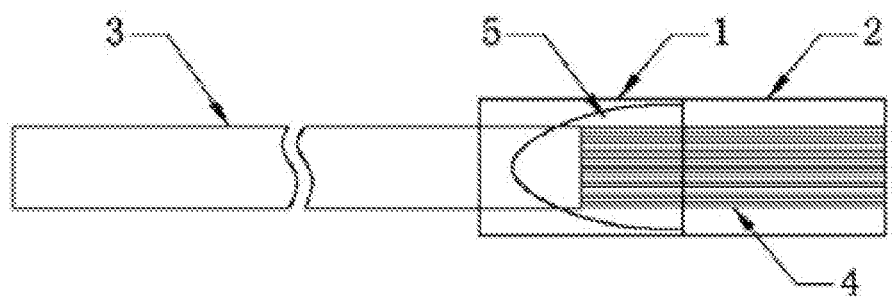
FIG. 3
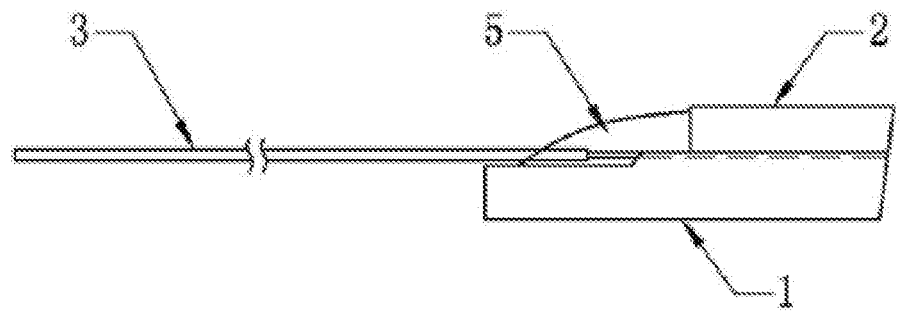
FIG. 4

OPTICAL FIBER ARRAY WITH HIGH RELIABILITY

CROSS-REFERENCE TO RELATED APPLICATIONS

The present application is a national phase application of PCT/CN2017/107799 which claims priority to Chinese Patent Application No. 201621180658.6 filed Oct. 27, 2016, the disclosure of which is incorporated by reference herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an optical fiber array with high reliability, falling within the technical field of optical fibers.

BACKGROUND

FTTH (Fiber To The Home) is the best solution for integrated access of voice, data and cable TV. FTTH access generally uses a passive optical network (PON), and an optical splitter is a core component in PON for achieving the distribution of optical signals. The optical splitter is composed of a light-splitting chip based on a planar light circuit (PLC) technology and an optical fiber array for input/output butt-coupling.

An arrayed waveguide grating (AWG) device is commonly used in the dense wavelength division multiplexing (DWDM) system, its core is the demultiplexer/multiplexer chip based on the PLC technology, and the input/output ports therein also need an optical fiber array for butt-coupling.

In large data centers, cabinets are interconnected by active optical cables (ADCs), and butt-coupling is also required for the optical fiber array, semiconductor laser array and detector array at the transceiver end of active optical cables.

Optical splitters, arrayed waveguide gratings and active optical cables may work in the harsh environment of high temperature and high humidity, thus requiring high reliability. As one of the main components, the optical fiber array shall also have a high degree of reliability.

The optical fiber array includes an optical fiber positioning substrate, a cover plate and a plurality of optical fiber ribbons. The positioning substrate is engraved with a micro-groove array of high precision for precise positioning of the optical fibers, and the optical fibers are pressed into the micro-groove by the cover plate and fixed with glue. The main factor that affects the reliability of the optical fiber array is glue de-bonding. Under the harsh environment of high temperature and high humidity, the phenomenon of de-bonding between the cover plate and the substrate occurs easily, which affects the positioning accuracy of the optical fiber and causes the failure of the device and the module.

Both the positioning substrate and the cover plate of the existing optical fiber array have a smooth optical surface, whose bonding strength with glue is not good enough. In the cross section of the optical fiber array assembly, glue filling and bonding conditions are shown in FIGS. 1 and 2. FIG. 1 and FIG. 2 are the enlarged schematic diagrams of the cross sections of a C-shaped groove positioning substrate and a V-shaped positioning substrate respectively, 10 is the end surface of the optical fiber, and 11 is the filled glue. It can be seen that all the gaps are filled and bonded with glue, but the tangential contact points between the optical fiber side and the positioning substrate or the cover plate are not bonded with glue, such as the positions 12, 13, 14 in the C-shaped groove and the positions 15, 16, 17 in the V-shaped groove. In harsh working conditions, de-bonding occurs easily in these positions, resulting in failure of the optical fiber array components.

SUMMARY OF THE INVENTION

In view of the above problem, this invention provides an optical element used in the field of optical fiber technology to solve the technical problem.

The optical element used in the field of optical fiber technology according to this invention is composed of three parts, namely, optical fiber positioning substrate 1, cover plate 2 and optical fiber ribbon 3. One end of the optical fiber ribbon 3 is stripped to be a naked fiber 4, the naked fiber 4 is pressed into a micro-groove array of the optical fiber positioning substrate 1 by the cover glass 2 and glued and fixed with a glue layer 5, and a transitional region between stripped part and unstripped part of the optical fiber ribbon 3 is glued and fixed onto the rear half of the optical fiber positioning substrate 1 with the glue layer 5.

Preferably, surfaces of both the optical fiber positioning substrate 1 and the cover plate 2 to be bonded with the glue layer 5 are frosted, and the optical fiber positioning substrate 1 and the cover plate 2 are made of quartz glass material, whose surface can be frosted by various processes, such as grit polishing, laser surface treatment, ion etching and chemical etching. In addition, C-shaped groove face or V-shaped groove face of the optical fiber positioning substrate 1 is also frosted; after frosting, glue can diffuse thoroughly into the gaps through the capillary effect, so the bonding area is greatly increased, and the substrate, cover plate, optical fiber and glue can form as a whole. Situations where there is no glue at the tangential positions such as the positions 12, 13, 14 in the C-shaped groove and the positions 15, 16, 17 in the V-shaped groove, can be avoided.

The invention has the following beneficial effects: It can overcome the shortcomings of the prior art, with a reasonable and novel structural design. Through frosting of the surface of the positioning substrate and cover plate to be bonded with glue, the bonding area can be increased and glue bonding strength can be enhanced, so that it can work in the harsh environment of high temperature and humidity without de-bonding to ensure the positioning accuracy of the optical fibers.

BRIEF DESCRIPTION OF THE DRAWINGS

For ease of explanation, this invention is described in detail in combination with the following preferred embodiments and accompanying drawings.

FIG. 1 is a schematic diagram of the cross section of the C-shaped groove optical fiber positioning substrate in the background art of this invention;

FIG. 2 is a schematic diagram of the cross section of the V-shaped groove optical fiber positioning substrate in the background art of this invention;

FIG. 3 is a schematic structural view of this invention;
FIG. 4 is a schematic side view of FIG. 3.

DETAILED DESCRIPTION

As shown in FIGS. 3-4, the following technical solution is adopted in this embodiment: The optical fiber array is composed of three parts, namely, optical fiber positioning substrate 1, cover plate 2 and optical fiber ribbon 3. One end of the optical fiber ribbon is stripped to be a naked fiber, the naked fiber 4 is pressed into a micro-groove array of the optical fiber positioning substrate 1 with the cover plate 2 and glued and fixed with a glue layer 5, and the transitional region between stripped part and unstripped part of the optical fiber ribbon 3 is glued and fixed onto the rear half of the optical fiber positioning substrate 1 with the glue layer 5.

Preferably, the surfaces of the said optical fiber positioning substrate 1 and the cover plate 2 to be bonded with the glue layer 5 are both frosted, and the optical fiber positioning substrate 1 and the cover plate 2 are made of quartz glass material, whose surfaces can be frosted through various processes, such as grit polishing, laser surface treatment, ion etching and chemical etching. In addition, the C-shaped groove face or V-shaped groove face of the optical fiber positioning substrate 1 is also frosted; after frosting, glue can diffuse thoroughly into the gaps through the capillary effect, so the bonding area is greatly increased.

In this embodiment, the surface of both the optical fiber positioning substrate 1 and the cover plate 2 is frosted, so the glue can diffuse thoroughly into the tangential contact positions 11, 12, 13 as shown in FIG. 1 or 15, 16 and 17 as shown in FIG. 2 in the cross section of the optical fiber positioning substrate 1 for bonding. Compared with existing optical fiber arrays without glue bonding in such positions, the bonding strength is significantly increased.

The basic principles, main features and advantages of this invention are shown and described above. It should be understood by those skilled in the art that this invention is not limited to the above embodiments, and the said embodiments and the description in the specification only describe the principles of this invention. Without departing from the spirit and scope of this invention, there may be various changes and improvements to this invention, which fall within the scope of protection of this invention. The scope of protection of this invention is defined by the appended claims and their equivalents.

The invention claimed is:

1. An optical fiber array to be applied in a parallel optical fiber transmission system, the optical fiber array comprising:
   an optical fiber positioning substrate having a first end portion and a second end portion, the first end portion of the optical fiber positioning substrate being spaced apart lengthwise from the second end portion of the optical fiber positioning substrate in a first direction, the optical fiber positioning substrate comprising an upper surface and a plurality of grooves formed in the upper surface extending lengthwise from the first end portion toward the second end portion, the optical fiber positioning substrate having a covered section adjacent the first end portion and an uncovered section adjacent the second end portion,
   a cover plate having a first end portion and a second end portion, the cover plate being affixed against the upper surface of the optical fiber positioning substrate along the covered section;
   an optical fiber ribbon comprising a plurality of optical fibers and having a stripped part, an unstripped part, and a transition region between the stripped part and the unstripped part, the stripped part being sandwiched between the substrate and the cover plate along the covered section of the optical fiber positioning substrate such that the cover plate presses each optical fiber of the optical fiber ribbon into a respective one of the plurality of grooves, wherein the transition region overlies the uncovered section of the optical fiber positioning substrate; and
   a glue layer applied to the optical fiber positioning substrate and having a first section along the covered section bonding the cover plate to the optical fiber positioning substrate and a second section along the uncovered section bonding the transition region of the optical fiber ribbon to the optical fiber positioning substrate, wherein the second section of the glue layer has a first end portion a second end portion spaced apart from the first end portion lengthwise in a second direction opposite the first direction, the first end portion of the second section of the glue layer located adjacent the second end portion of the cover plate and the second end portion of the second section of the glue layer being spaced apart lengthwise from the second end portion of the optical fiber positioning substrate in the first direction such that the second end portion of the optical fiber positioning substrate protrudes lengthwise relative to the second end portion of the glue layer in the second direction.

2. An optical fiber array according to claim 1, wherein the upper surface of the optical fiber positioning substrate is frosted by one or more frosting processes selected from a group of frosting processes consisting of laser surface treatment and ion etching.

3. An optical fiber array according to claim 1,
   wherein the optical fiber positioning substrate and the cover plate are made of quartz glass material and the upper surface of the optical fiber positioning substrate and an opposing lower surface of the cover plate are each frosted; and
   wherein each of the grooves is one of a C-shaped groove and a V-shaped groove and surfaces of the optical fiber positioning substrate which define the grooves are frosted.

4. The optical fiber array as set forth in claim 1 wherein the optical fiber positioning substrate includes side edges extending from the first end portion to the second end potion, the second section of the glue layer tapering inward from the side edges as the glue layer extends in the second direction toward the second end portion.

5. A method for arraying optical fibers used in a parallel optical fiber transmission system, the method comprising:
   providing an optical fiber positioning substrate, a cover plate and an optical fiber ribbon;
   frosting opposing surfaces of the optical fiber positioning substrate and the cover plate by at least one of treating the opposing surfaces with a laser surface treatment and ion etching the opposing surfaces;
   wherein one end of the optical fiber ribbon is stripped to be a naked fiber which is pressed into a micro-groove array of the optical fiber positioning substrate with the cover plate and glued and fixed with a glue layer; and
   wherein a transitional region between stripped part and unstripped part of the optical fiber ribbon is glued and fixed onto a rear half of the optical fiber positioning substrate with the glue layer.

6. A method for arraying optical fibers according to claim 5, further comprising
frosting surfaces defining a plurality of C-shaped grooves or V-shaped grooves of the optical fiber positioning.

* * * * *